United States Patent
Jäger et al.

[11] Patent Number: 5,801,230
[45] Date of Patent: Sep. 1, 1998

[54] POLYFUNCTIONAL AZO REACTIVE DYESTUFFS

[75] Inventors: Horst Jäger, Leverkusen; Frank-Michael Stöhr, Odenthal, both of Germany

[73] Assignee: Bayer Aktiengesellschaft, Leverkusen, Germany

[21] Appl. No.: 651,285

[22] Filed: May 22, 1996

[30] Foreign Application Priority Data

May 31, 1995 [DE] Germany ............... 195 19 823.9

[51] Int. Cl.$^6$ .................. C09B 62/513; C09B 67/24; D06P 1/384
[52] U.S. Cl. .................. 534/642; 534/641; 534/591
[58] Field of Search ........................... 534/642, 641

[56] References Cited

U.S. PATENT DOCUMENTS

| | | | |
|---|---|---|---|
| 2,670,265 | 2/1954 | Heyna et al. | 534/642 X |
| 3,895,004 | 7/1975 | De Montmollin et al. | 534/642 |
| 4,069,218 | 1/1978 | Hegar | 534/637 |
| 4,378,312 | 3/1983 | Hoyer et al. | 534/636 |
| 5,200,511 | 4/1993 | Loeffler et al. | 534/634 |

FOREIGN PATENT DOCUMENTS

| | | | |
|---|---|---|---|
| 965 902 | 9/1957 | Germany . | |
| 549 963 | 10/1973 | Switzerland . | |
| 2007698 | 5/1979 | United Kingdom | 534/636 |
| 2008145 | 5/1979 | United Kingdom | 534/636 |

*Primary Examiner*—Floyd D. Higel
*Attorney, Agent, or Firm*—Sprung Kramer Schaefer & Briscoe

[57] ABSTRACT

Azo reactive dyestuffs have the following formula $$D^1-N=N-K^1-Y-K^2-N=N-D^2 \qquad (1)$$

where
the radicals $D^1$ and $D^2$ are identical or different and are the radical of a diazo component of the formula $$XSO_2-B-D- \qquad (2).$$

5 Claims, No Drawings

POLYFUNCTIONAL AZO REACTIVE DYESTUFFS

The invention relates to novel polyfunctional azo reactive dyestuffs, their preparation and use.

Polyfunctional reactive dyestuffs, including those having at least two azo groups, are already known, see DE-A 2,515,137 (U.S. Pat. No. 4,069,218), DE-A 2,748,929, DE-A 2,748,966 (GB-A-2,007,698), DE-A 2,748,965 (U.S. Pat. No. 4,485,041) and DE-A 4,113,838 (U.S. Pat. No. 5,200,511).

However, the known dyestuffs still have disadvantages in terms of their technical application properties.

The present invention provides azo reactive dyestuffs of the formula $$D^1-N=N-K^1-Y-K^2-N=N-D^2 \quad (1)$$

in which

Y is a bifunctional acyl radical from the aliphatic or aromatic series, for example:

$$-\overset{\text{O}}{\underset{\|}{C}}-\overset{\text{O}}{\underset{\|}{C}}-, \quad -\overset{\text{O}}{\underset{\|}{C}}-(CH_2)_{1-6}-\overset{\text{O}}{\underset{\|}{C}}-, \quad -\overset{\text{O}}{\underset{\|}{C}}-CH=CH-\overset{\text{O}}{\underset{\|}{C}}-,$$

$$-\overset{\text{O}}{\underset{\|}{C}}- \text{ or } -\overset{\text{O}}{\underset{\|}{C}}-A-CO-$$

in which the two carbonyl groups of the benzene ring A are in the o, m or p positions relative to one another and benzene ring A can be substituted by Cl, $CH_3$ or $OCH_3$, $K^1$ and $K^2$ are identical or different and are the radical of a coupling component from the aminobenzene, aminonaphthalene, aminohydroxynaphthalene, acetoacetarylide or heterocyclic series, $D^1$ and $D^2$ are identical or different and are the radical of a diazo component of the formula $$X-SO_2-B-D- \quad (2)$$

in which

D is a substituted or unsubstituted benzene or naphthalene ring,

B is a direct bond or a divalent bridging member, and

X is $CH=CH_2$ or $CH_2CH_2Z$ where

Z is a substituent which can be eliminated under alkaline conditions.

Examples of substituents of D are:

$C_1-C_4$-alkyl, in particular $CH_3$, substituted or unsubstituted $C_1-C_4$-alkoxy, substituted or unsubstituted $NH_2$, COOH, $SO_3H$, OH, halogen, in particular Cl, $SCH_2CH_2OH$, $SCH_2COOH$.

Examples of substitutents of the alkoxy groups in the radical D are:

COOH, OH, $SO_3H$, $OSO_3H$, $OCH_3$, $OC_2H_5$, $OCH_2CH_2OH$.

Examples of substituents of the amino group in the radical D are:

$CH_3$, $C_2H_5$, $C_2H_4OH$, $CH_2CH_2SO_3H$, $CH_2COOH$, $CH_2CH_2COOH$, $CH_2CH_2NHCOCH_2CH_2COOH$, $CH_2CH_2SO_2CH_2CH_2OSO_3H$, $CH_2CH_2CH_2SO_2CH_2CH_2OSO_3H$, $CH_2CH_2OSO_3H$ or phenyl radicals which are unsubstituted or substituted by $C_1-C_4$-alkyl, $C_1-C_4$-alkoxy, $SO_3H$, COOH and/or $SO_2CH_2CH_2OSO_3H$, further examples of the substituted amino groups being the members for completing a ring, in particular those for completing a morpholine, cyclohexylamine or cyclopentylamine ring.

Examples of divalent bridging members B are:

$$-\underset{R}{\overset{|}{N}}-, \quad -CH_2-, \quad \overset{*}{-}\underset{\underset{H}{|}}{N}-\overset{\text{O}}{\underset{\|}{C}}-(CH_2)_{1-4}$$

$$\overset{*}{-}\overset{\text{O}}{\underset{\|}{C}}-NR-(CH_2)_{2-4}, \quad \overset{*}{-}\overset{\text{O}}{\underset{\|}{C}}-NR-\underset{}{\bigcirc}$$

$$\overset{*}{-}SO_2-\underset{\underset{H}{|}}{N}-\underset{}{\bigcirc}$$

the bond marked with an asterisk being linked to the radical D and R being H or $C_1-C_4$-alkyl, in particular $CH_3$ and $C_2H_5$.

Examples of Z are:

$OSO_3H$, $S_2O_3H$, $OPO_3H_2$, Cl, $OCOCH_3$, $OSO_2CH_3$.

Examples of coupling components from the aminobenzene series having the meaning of $K^1$ and $K^2$ are:

in which

R has the meaning given, $R^1$ is H, $C_1-C_4$-alkyl, in particular $CH_3$, $C_1-C_4$-alkoxy, in particular $OCH_3$, halogen, in particular Cl, or $$\underset{R}{\overset{|}{N}}-acyl$$

where R has the meaning given and acyl is, for example, $$-\overset{\text{O}}{\underset{\|}{C}}CH_3, -\overset{\text{O}}{\underset{\|}{C}}C_2H_5, -\overset{\text{O}}{\underset{\|}{C}}C_3H_7, -\overset{\text{O}}{\underset{\|}{C}}C_4H_9, -\overset{\text{O}}{\underset{\|}{C}}NH_2,$$

$$-\overset{\text{O}}{\underset{\|}{C}}NH-\underset{}{\bigcirc}, -\overset{\text{O}}{\underset{\|}{C}}-\underset{}{\bigcirc}, -\overset{\text{O}}{\underset{\|}{C}}-\underset{COOH}{\bigcirc},$$

$$-\overset{\text{O}}{\underset{\|}{C}}CH_2OH, -\overset{\text{O}}{\underset{\|}{C}}CH_2OSO_3H, -\overset{\text{O}}{\underset{\|}{C}}CH_2Cl$$

and $R^2$ is H, $C_1-C_4$-alkyl, in particular $CH_3$, $C_1-C_4$-alkoxy, in particular $OCH_3$, halogen, in particular Cl, $SO_3H$ or COOH.

Examples of coupling components from the aminonaphthalene series having the meaning of $K^1$ and $K^2$ are:

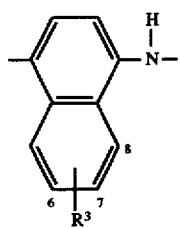

where $R^3$ is H or $SO_3H$ and is bonded in the 6, 7 or 8 position.

Examples of coupling components from the aminohydroxynaphthalene series having the meaning of $K^1$ and $K^2$ are the following:

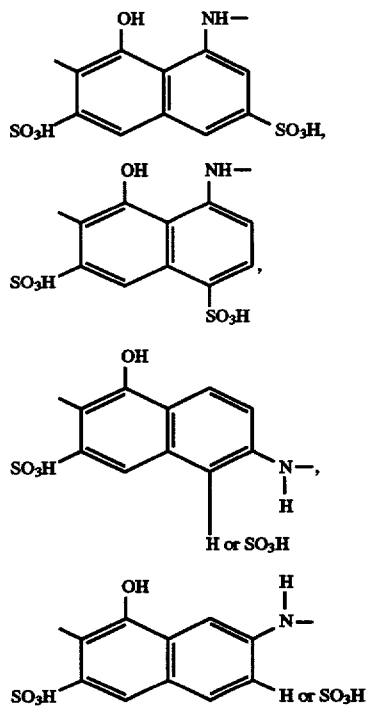

Further examples of coupling components having the meaning of $K^1$ and $K^2$ are the following:

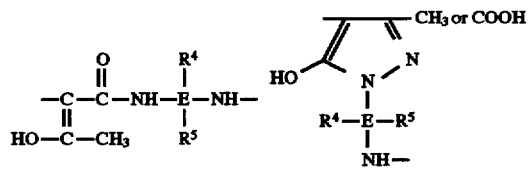

in which

E is a benzene or naphthalene ring, $R^4$ and $R^5$, independently of one another, are H, $C_1$–$C_4$-alkyl, in particular $CH_3$, $C_1$–$C_4$-alkoxy, in particular $OCH_3$, halogen, in particular Cl, COOH or $SO_3H$.

Preferred acetoacetarylide components $K^1$ and $K^2$ are:

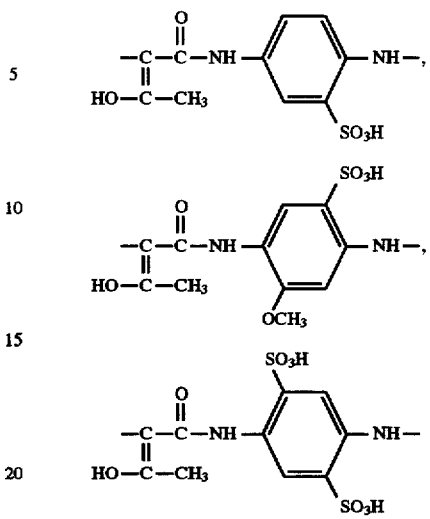

Preferred heterocyclic components $K^1$ and $K^2$ are:

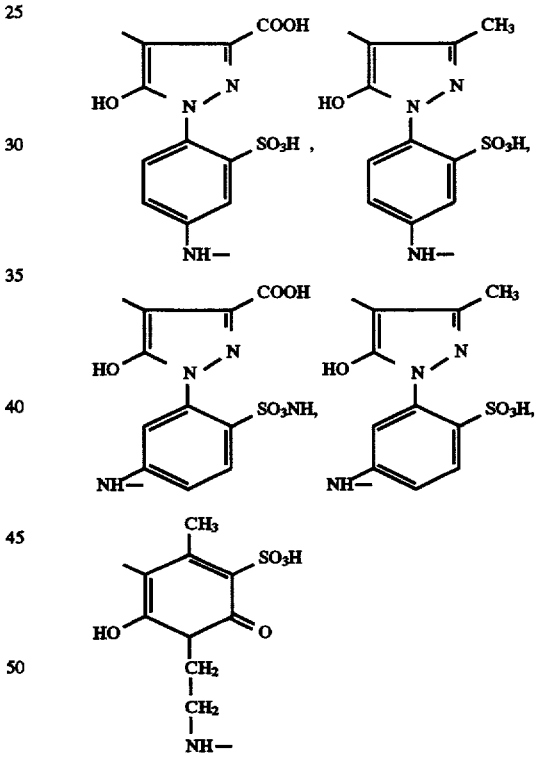

Within formula (1), preference is given to dyestuffs exhibiting at least one of the following features 1–5:

1. $D^1=D^2$
2. $K^1=K^2$
3. B=direct bond
4. X=CH=$CH_2$ or $CH_2CH_2OSO_3H$

5. 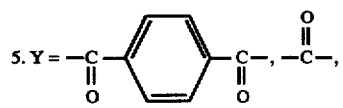

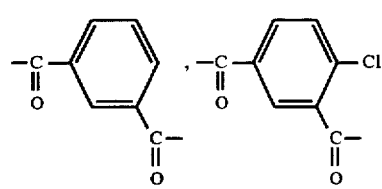

Furthermore, particular preference is given to dyestuffs in which $K^1$ and $K^2$ are the radical of a coupling component from the aminohydroxynaphthalene series, in particular

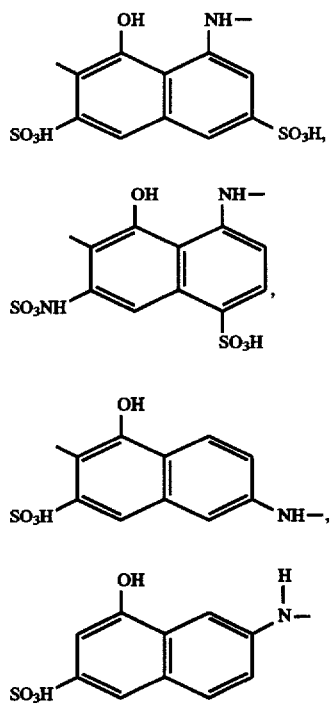

and to those in which $D^1 = D^2$ and is

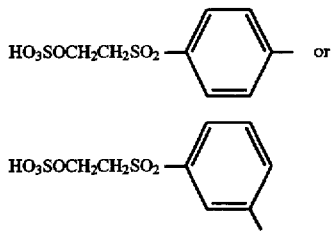

The invention furthermore provides processes for preparing dyestuffs of the formula (1), in which diazo components of the formulae $$D^1\text{—}NH_2 \qquad (2a)$$

and $$D^2\text{—}NH_2 \qquad (2b)$$

in which $D^1$ and $D^2$ have the meaning given are diazotized and coupled onto coupling components of the formula $$H\text{—}K^1\text{—}Y\text{—}K^2\text{—}H \qquad (3)$$

in which $K^1$, $K^2$ and Y have the meaning given.

A further process comprises condensing aminoazo dyestuffs of the formulae $$D^1\text{—}N{=}N\text{—}K^1\text{—}H \qquad (4a)$$

and $$D^2\text{—}N{=}N\text{—}K^2\text{—}H \qquad (4b)$$

in which $D^1$, $D^2$, $K^1$ and $K^2$ have the meaning given with a bifunctional acyl compound of the formula $$Cl\text{—}Y\text{—}Cl \qquad (5)$$

in which Y has the meaning given.

The conditions of these reactions are those customary in the area of acylation, diazotization and coupling. Thus, the dyestuffs are preferably prepared in an aqueous medium.

Below, examples of compounds of the formulae 2a, 2b, 3, 4a, 4b and 5 are listed.

Preferred compounds of 2a and 2b:

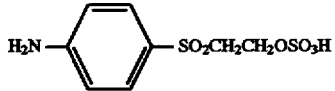

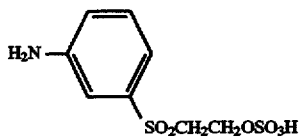

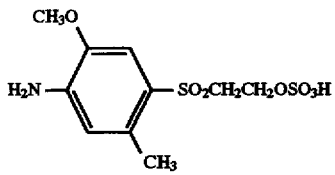

-continued
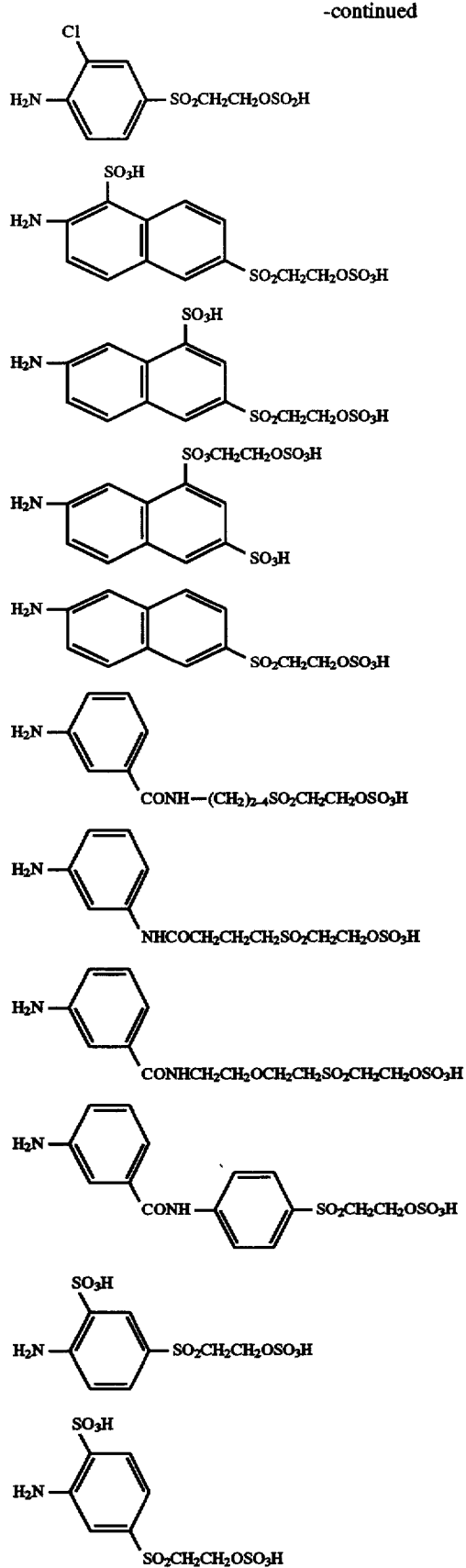

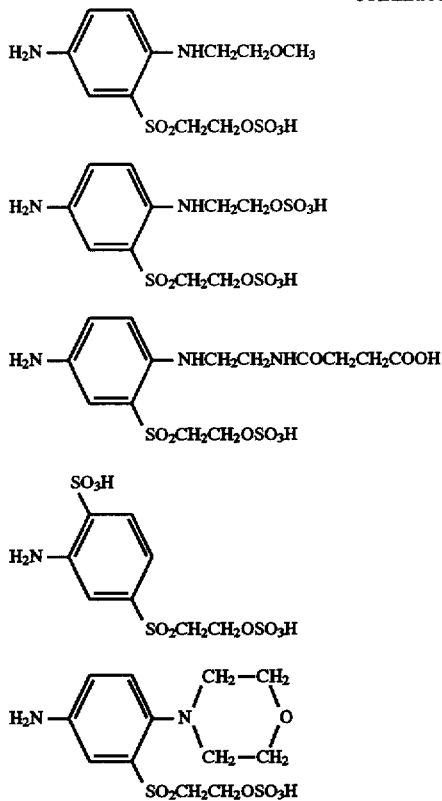
Preferred compounds 3:
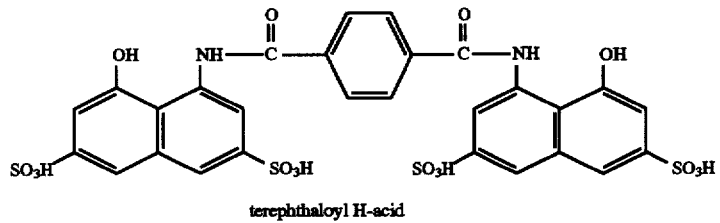
terephthaloyl H-acid
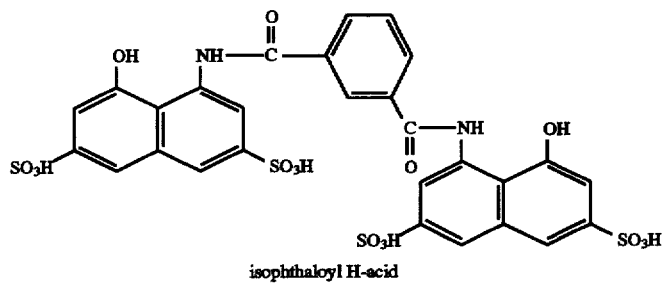
isophthaloyl H-acid
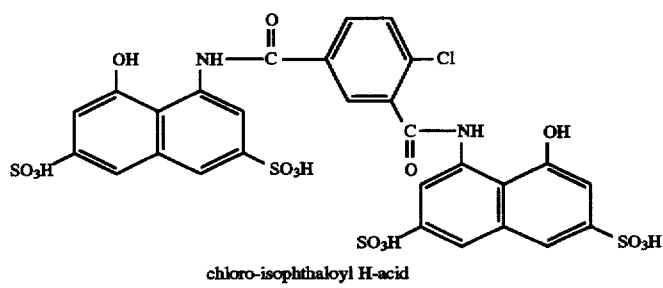
chloro-isophthaloyl H-acid -continued
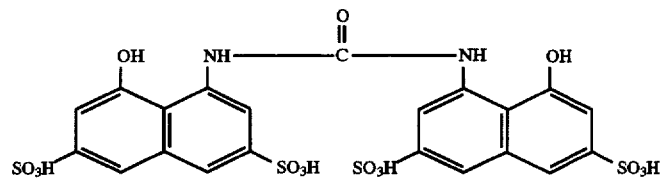
H-acid urea
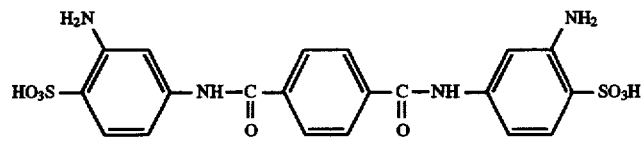
terephthaloyl-metaminic acid
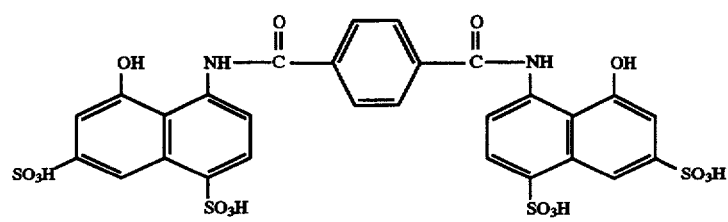
terephthaloyl K-acid
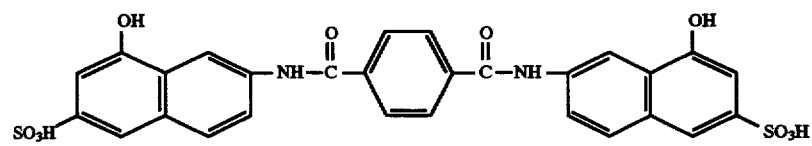
terephthaloyl γ-acid
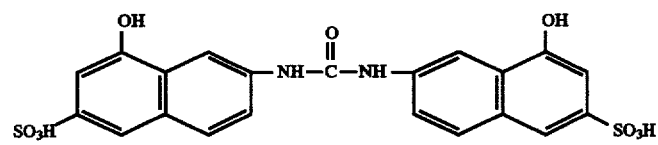
γ-acid-urea
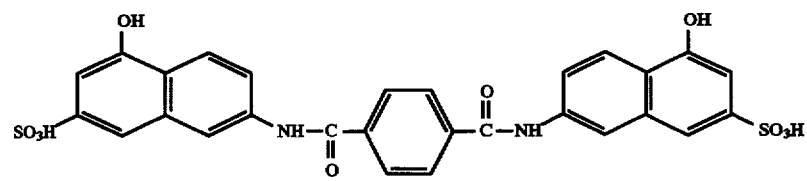
terephthaloyl I-acid
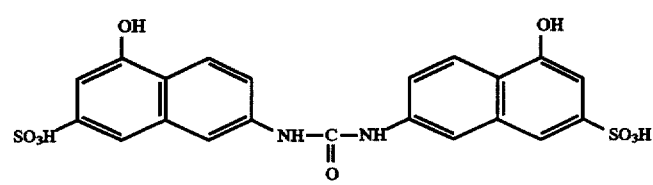
I-acid-urea -continued
Preferred compounds 4a and 4b:
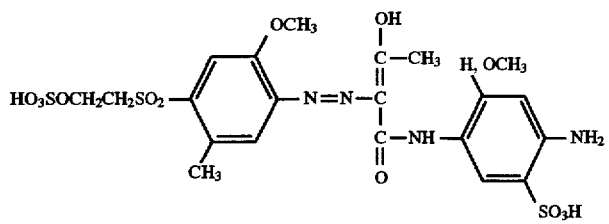
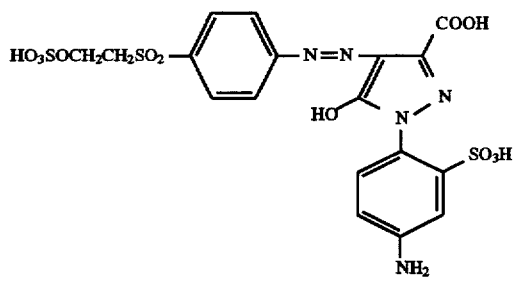
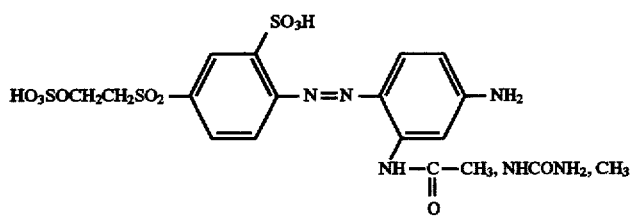
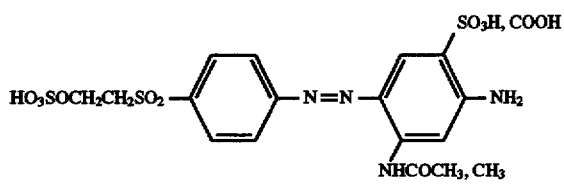
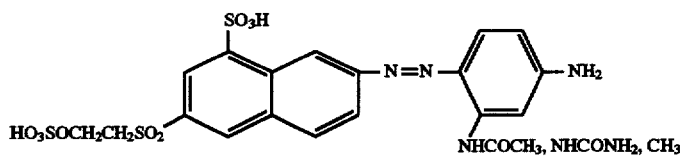
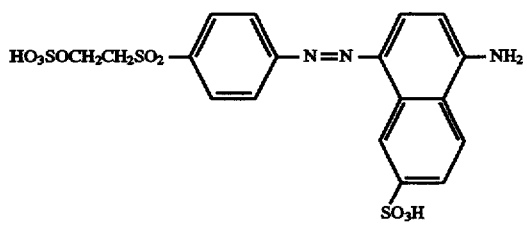
Preferred compounds 5:
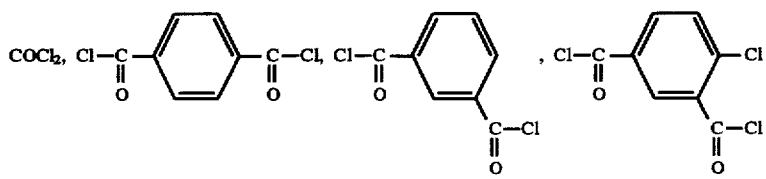
Isolation of the reactive dyestuffs obtained by the methods described above is effected in the usual manner by salting out, for example with sodium chloride or potassium chloride, or by evaporation of the neutral aqueous dyestuff solution, preferably at moderately elevated temperature and reduced pressure, or by spray-drying. The dyestuffs can be used as solid finishes or as concentrated solutions.

In a preferred embodiment, the dyestuffs according to the invention are used as granules. The granulated dyestuffs according to the invention can be obtained, for example, by the following steps:

Mixed Granulation

In this method, the dye powder is wetted with 15 to 55% water, relative to the weight of the powder, and the mixture is then granulated under drying conditions in a mixing granulator, and, if desired, the granulated material is subjected to dustproofing, the dustproofing agent being preferably sprayed onto the granules as an aerosol mixture.

Granulation by Spraying

In this method, the synthesis solution or suspension is dried and granulated simultaneously in a fluidizing spray drier.

The invention furthermore provides solid dyestuff preparations, in particular dyestuff powders or dyestuff granules, containing 30–95% by weight of a reactive dyestuff of the formula (I), 5–15% by weight of water (residual moisture), in each case relative to the preparation. In addition, they may contain further additives, such as inorganic salts, for instance alkali metal chlorides or alkali metal sulfates, dispersing agents, wetting agents, dustproofing agents and further customary standardizing agents.

Preferred solid preparations additionally contain buffer substances which, when dissolved in 20 times the amount of water (relative to the weight of the solid preparation), give a pH of 3.5 to 7.5, in particular 4.5 to 6.5. These buffer substances are preferably added in amounts of 3 to 50, in particular 5 to 15, % by weight, relative to the total weight.

In general, aqueous reactive dyestuff solutions contain 5 to 50% by weight of a dyestuff of the formula (I) (relative to the total weight of the solution).

Additionally, preferred aqueous reactive dyestuff solutions contain buffer substances and have a pH of 3.5 to 7.5, in particular 4.5 to 6.5.

These buffer substances are preferably added in amounts of 0.1 to 50, in particular 1 to 20, % by weight, relative to the total mixture.

The buffers used are unreactive with the reactive groups. Examples of buffers are sodium dihydrogen phosphate, sodium acetate, potassium acetate, sodium borate, potassium borate, sodium oxalate, potassium oxalate and sodium hydrogen phthalate. These buffers can be used on their own or in a mixture.

The reactive dyestuffs of the formula (I) according to the invention possess valuable dye properties. By virtue of the fiber-reactive group $SO_2X$, they possess fiber-reactive properties.

The reactive dyestuffs of the formula (I) according to the invention produce dyeings exhibiting good wet and light fastness properties. It should be pointed out in particular that the dyestuffs have good solubility and electrolyte solubility in combination with good exhaustion properties and high fixation of the dye and that the unfixed portions of dye can be easily removed.

The reactive dyestuffs of the formula (I) according to the invention are suitable for dyeing and printing hydroxyl- or amido-containing materials, such as textile fibers, filaments and fabrics made of wool, silk, synthetic polyamide and polyurethane fibers, and for producing dyeings and prints having good wash fastness properties on native and regenerated cellulose, the treatment of cellulose materials being advantageously carried out in the presence of acid scavengers and, where appropriate, by application of heat by the methods known for reactive dyestuffs.

The formulae given are those of the corresponding free acids. In general, the dyestuffs are isolated and used for dyeing in the form of the alkali metal salts, in particular the sodium salts.

EXPERIMENTAL SECTION

EXAMPLE 1 a) Diazotization 28.1 g of 4-(β-sulfatoethylsulfonyl)-aniline are dissolved in 400 ml of water at a pH of 5–6. 28 ml of 30% hydrochloric acid are then added, followed by dropwise addition of 70 ml of 10% sodium nitrite solution. Stirring is continued for 1 hour, and excess nitrite is removed by means of sulfamic acid.

b) Coupling 38.4 g of terephthaloyl H-acid are dissolved in 1200 ml of water at 80° C. This solution is run into the diazonium salt solution, during which the pH is maintained between 4.5 and 5.5 by sprinkling in sodium bicarbonate and the temperature is prevented from rising above 25° C. by cooling from the outside. Coupling rapidly goes to completion. The dyestuff can be precipitated from the clear solution by salting out with potassium chloride. Suction filtration and drying at 70° C. in a through-circulation drying oven give a red dyestuff powder which is readily soluble in water to give a red solution. Alternatively, the reaction solution can be concentrated by pressure permeation, and the dyestuff can be isolated therefrom by spray-drying.

In the form of the free acid, the dyestuff has the following formula

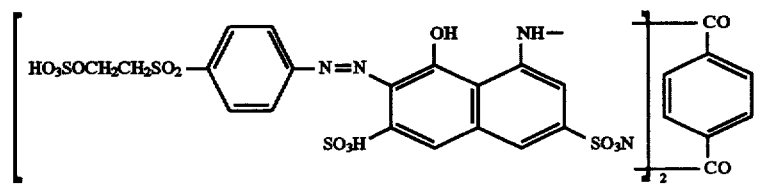

This dyestuff produces strong red dyeings exhibiting good general fastness properties on cotton by any of the dyeings methods customary for vinylsulfonyl dyestuffs ($\lambda_{max}$=500 nm).

EXAMPLE 2 a) Diazotization
As in Example 1 b) Coupling 38.4 g of terephthaloyl H-acid are stirred in 500 ml of water. The suspension obtained from the diazotization according to a) is then added, and stirring at pH 5–6 is continued until no more disazo compound can be detected. Further work-up can be carried out by the procedure of Example 1.

The dyestuff is identical to that obtained by the procedure of Example 1. Further valuable dyestuffs are obtained by repeating the procedure of Example 1 or 2 and using the diazo components listed in column 2 and the coupling components shown in column 3. The last columm lists the hues obtainable therewith on cotton.

| Example | Diazo component | Coupling component | Hue on cotton |
|---|---|---|---|
| 3 | 3-[β-sulfatoethyl-sulfonyl]-aniline | terephthaloyl H-acid | red $\lambda_{max} = 504$ nm |
| 4 | 4-[β-sulfatoethyl-sulfonyl]-2-methoxy-5-methyl-aniline | terephthaloyl H-acid | bluish red $\lambda_{max} = 535$ nm |
| 5 | 4-[β-sulfatoethyl-sulfonyl]-2-chloro-aniline | terephthaloyl H-acid | red $\lambda_{max} = 498$ nm |
| 6 | 6-[β-sulfatoethyl-sulfonyl]-1-sulfo-2-amino-naphthalene | terephthaloyl H-acid | bluish red $\lambda_{max} = 525$ nm |
| 7 | 6-[β-sulfatoethyl-sulfonyl]-8-sulfo-2-amino-naphthalene | terephthaloyl H-acid | bluish red $\lambda_{max} = 530$ nm |
| 8 | 4-[β-sulfatoethyl-sulfonyl]-aniline-2-sulfonic acid | terephthaloyl H-acid | red $\lambda_{max} = 490$ nm |
| 9 | 4-[β-sulfatoethyl-sulfonyl]-aniline | terephthaloyl K-acid | yellowish red |
| 10 | 3-[β-sulfatoethyl-sulfonyl]-aniline | terephthaloyl K-acid | yellowish red |
| 11 | 6-[β-sulfatoethyl-sulfonyl]-1-sulfo-2-amino-naphthalene | terephthaloyl K-acid | bluish red |
| 12 | 4-[β-sulfatoethyl-sulfonyl]-2-chloro-aniline | terephthaloyl K-acid | bluish red |
| 13 | 4-[β-sulfatoethyl-sulfonyl]-aniline-2-sulfonic acid | terephthaloyl K-acid | yellowish red |
| 14 | 6-[β-sulfatoethyl-sulfonyl]-2-amino-naphthalene | terephthaloyl K-acid | bluish red |
| 15 | 4-[β-sulfatoethyl-sulfonyl]-aniline | isophthaloyl H-acid | red $\lambda_{max} = 518$ nm |
| 16 | 4-[β-sulfatoethyl-sulfonyl]-aniline | chloro-isophthaloyl H-acid | red |
| 17 | 4-[β-sulfatoethyl-sulfonyl]-aniline | H-acid-urea | red |
| 18 | 4-[β-sulfatoethyl-sulfonyl]-aniline | isophthaloyl H-acid | yellowish red |
| 19 | 4-[β-sulfatoethyl-sulfonyl]-aniline | chloro-isopthaloyl H-acid | yellowish red |
| 20 | 4-[β-sulfatoethyl-sulfonyl]-aniline | K-acid-urea | yellowish red |
| 21 | 4-[β-sulfatoethyl-sulfonyl]-aniline | I-acid-urea | orange |
| 22 | 4-[β-sulfatoethyl-sulfonyl]-aniline | γ-acid-urea | scarlet |
| 23 | 4-[β-sulfatoethyl-sulfonyl]-aniline | terephthaloyl J-acid | orange |
| 24 | 4-[β-sulfatoethyl-sulfonyl]-aniline | terephthaloyl γ-acid | scarlet |
| 25 | 6-[β-sulfatoethyl-sulfonyl]-aniline-2-sulfonic acid | terephthaloyl γ-acid urea | scarlet |
| 26 | 6-[β-sulfatoethyl-sulfonyl]-2-amino-1-sulfo-naphthalene | I-acid-urea | reddish orange |
| 27 | 4-[β-sulfatoethyl-sulfonyl]-2-methoxy-5-methyl-aniline | I-acid-urea | scarlet |

EXAMPLE 28

0.1 mol of the dyestuff of the formula

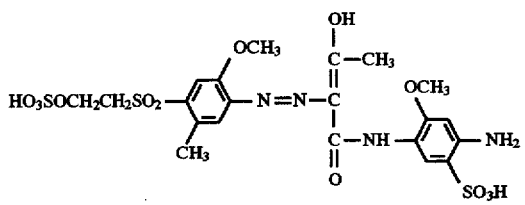

is stirred in 1 l of water. 0.5 mol of terephthaloyl dichloride is then added, and the mixture is heated to 50°–60° C., during which the hydrochloric acid released during condensation is neutralized by sprinkling in bicarbonate. The resulting dyestuff is precipitated by salting out with potassium chloride. Suction filtration, drying at 70° C. in a through-circulation drying oven and milling give a yellow dyestuff powder which is readily soluble in water to give a greenish yellow solution. It dyes cotton in a clear greenish yellow by the dyeing methods customary for vinylsulfonyl dyestuffs.

The dyestuff has the following formula:

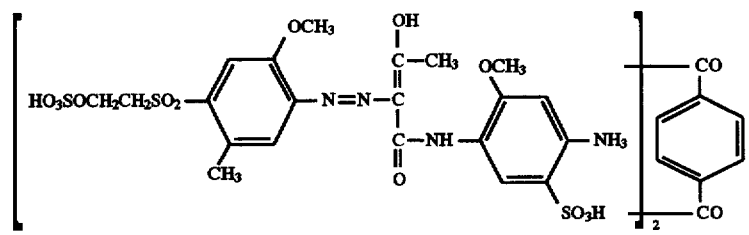

EXAMPLE 29 a) Diazotization 28.1 g of 4-(β-sulfatoethylsulfonyl)-aniline are dissolved in 400 ml of water at a pH of 5–6. 28 ml of 30% hydrochloric acid are then added, followed by dropwise addition of 70 ml of 10% sodium nitrite solution. Stirring is continued for 1 hour, and excess nitrite is removed by means of sulfamic acid.

b) Coupling 27.9 g of 7,7'-(fumaroyldiimino)bis[1-hydroxy-naphthalene-3-sulfonic acid] are stirred in 300 ml of water. The diazonium salt solution is then added to this solution at a pH of 5–6. Coupling rapidly goes to completion. The dyestuff can be isolated by salting out with potassium chloride. Drying at 70° C. in a through-circulation drying oven and milling give a red dyestuff powder which is readily soluble in water to give a red solution. Alternatively, the dyestuff can be isolated by spray-drying the reaction solution.

In the form of the free acid, the dyestuff has the formula

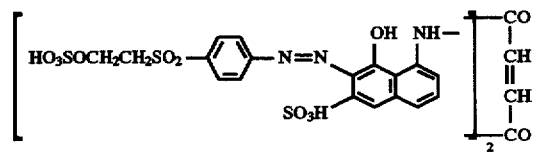

It produces yellowish red dyeings on cotton. Further valuable dyestuffs which likewise produce yellowish red dyeings on cotton are obtained by repeating the procedure of this example but using, instead of the fumaroyl-bridged 1-hydroxy-7-amino-naphthalene-3-sulfonic acid (γ acid) dimer, γ acid dimer bridged by the following bifunctional acid chlorides as the coupling component:

succinyl chloride
glutaryl dichloride
adipoyl chloride
oxalyl chloride

EXAMPLE 30 a) Diazotization 28.1 g of 4-(β-sulfatoethylsulfonyl)-aniline are dissolved in 400 ml of water at a pH of 5–6. 28 ml of 30% hydrochloric acid are then added, followed by dropwise addition of 70 ml of 10% sodium nitrite solution. Stirring is continued for 1 hour, and excess nitrite is removed by means of sulfamic acid.

b) Diazotization 36.1 g of 4-(β-sulfatoethylsulfonyl)aniline-2-sulfonic acid are stirred in 500 ml of ice-water, and 28 ml of 30% hydrochloric acid are added. This is followed by dropwise addition of 70 ml of 10% sodium nitrite solution, and the mixture is stirred until only a slight excess of nitrite remains. This excess is then destroyed by means of sulfamic acid.

c) Coupling

The diazonium salt solutions obtained by a) and b) are mixed. A hot solution at 80°–90° C. of 76.8 g of terephthaloyl H-acid in water is run into this initial charge, during which the temperature is prevented from rising above 25° C. by cooling from the outside. The pH is maintained at 5–6 by sprinkling in sodium bicarbonate.

Coupling rapidly goes to completion. The dyestuff can be precipitated from the clear solution by salting out with potassium chloride. Suction filtration and drying at 70° C. in a through-circulation drying oven give a red dyestuff powder which is readily soluble in water to give a red solution. Alternatively, the reaction solution can be concentrated by pressure permeation, and the dyestuff can be isolated therefrom by spray-drying.

This gives a mixture of dyestuffs. Apart from the two dyestuffs containing the same diazo component, the dyestuff containing the two different diazo components is obtained. In the form of the free acid, this dyestuff has the following formula

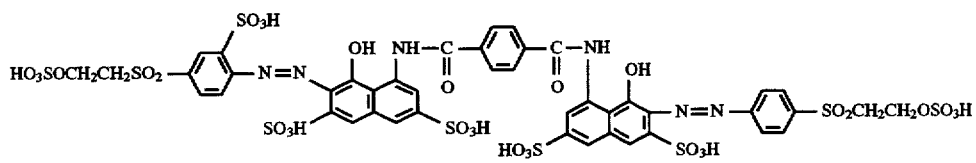

This dyestuff produces strong red dyeings exhibiting good general fastness properties on cotton by any of the dyeing methods customary for vinylsulfonyl dyestuffs.

Further valuable dyestuffs are obtained by repeating the procedure of this example and using, instead of terephthaloyl H-acid, the coupling components shown below. The last columm of the table below lists the hues on cotton.

| Example | Coupling component | Hue on cotton |
|---------|---------------------|---------------|
| 31 | terephthaloyl K-acid | yellowish red |
| 32 | terephthaloyl I-acid | orange |
| 33 | terephthaloyl γ-acid | scarlet |
| 34 | I-acid-urea | orange |
| 35 | γ-acid-urea | scarlet |
| 36 | fumaroyl γ-acid | scarlet |
| 37 | 8,8'-(oxaloyldiimino)-bis[1-hydroxy-naphthalene-3,6-disulfonic acid] | red |
| 38 | 8,8'-(oxaloyldiimino)-bis[1-hydroxy-naphthalene-3,5-disulfonic acid] | yellowish red |
| 39 | 6,6'-(oxaloyldiimino)-bis[1-hydroxy-naphthalene-3 sulfonic acid] | orange |
| 40 | 6,6'-(glutaroyldiimino)-bis[1-hydroxy-naphthalene-3-sulfonic acid] | orange |
| 41 | 7,7'-(glutaroyldiimino)-bis[1-hydroxy-naphthahalene-3 sulfonic acid] | scarlet |

EXAMPLE 42 a) Diazotization 28.1 g of 4-(β-sulfatoethylsulfonyl)-aniline are dissolved in 400 ml of water at a pH of 5–6 28 ml of 30% hydrochloric acid are then added, followed by dropwise addition of 70 ml of 10% sodium nitrite solution. Stirring is continued for 1 hour, and excess nitrite is removed by means of sulfamic acid.

b) Coupling 25.3 g of terephthaloyl-metaminic acid are introduced into the diazonium salt solution. Coupling is completed in a pH range of 2 to 4, which is achieved by sprinkling in bicarbonate.

The pH is then adjusted to 5 to 6, and the dyestuff is isolated by spray-drying. This gives a yellow dyestuff powder which is readily soluble in water to give a yellow solution. In the form of the free acid, the dyestuff has the formula

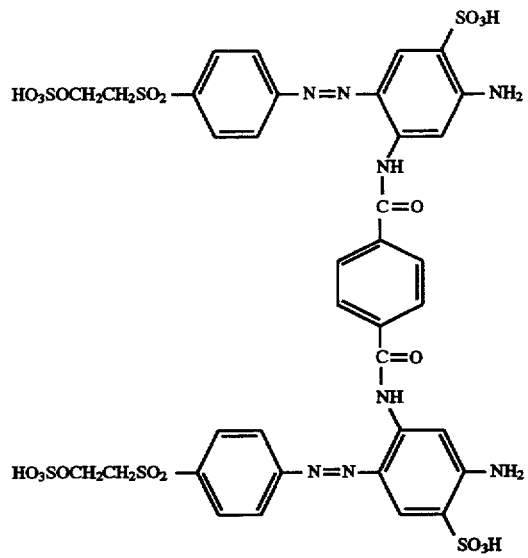

This dyestuff produces reddish yellow dyeings on cotton by any of the dyeing methods customary for vinylsulfonyl dyestuffs.

Further valuable dyestuffs are obtained by repeating the procedure of this example and replacing terephthaloyl-metaminic acid, 2,4-diaminobenzene-1-sulfonic acid (metaminic acid) dimer bridged with the following bifunctional acid chlorides as the coupling component.

phosgene
oxalyl chloride
succinyl chloride
fumaryl chloride
isophthaloyl dichloride
glutaryl dichloride
adipoyl chloride

What is claimed is:

1. An azo reactive dyestuff of the formula $$D^1{-}N{=}N{-}K^1{-}Y{-}K^2{-}N{=}N{-}D^2 \qquad (1)$$

in which
Y is a bifunctional acyl radical of the formula

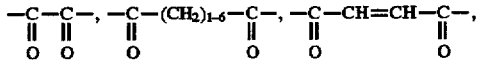

or

in which the two carbonyl groups of the benzene ring A are in the p position relative to one another and benzene ring A is unsubstituted or substituted by a substituent selected from the group consisting of Cl, CH₃ and OCH₃

$K^1$ and $K^2$ are identical or different and represent a radical of the formulae

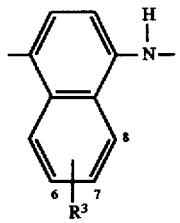

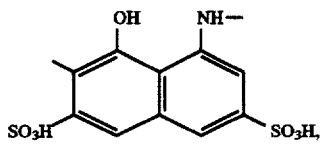

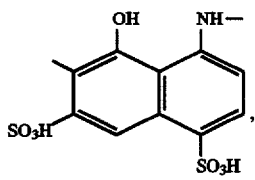

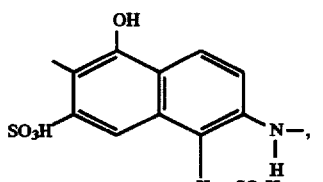

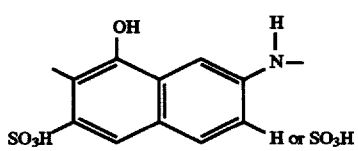

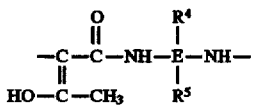

or,

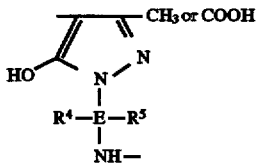

in which

R is H or $C_1$–$C_4$-alkyl, $R^1$ is H, $C_1$–$C_4$-alkyl, $C_1$–$C_4$-alkoxy, halogen or —NR-acyl, $R^2$ is H, $C_1$–$C_4$-alkyl, $C_1$–$C_4$-alkoxy, halogen, $SO_3H$ or COOH, $R^3$ is H or $SO_3H$, and $R^4$, $R^5$, independently of one another, are H, $C_1$–$C_4$-alkyl, $C_1$–$C_4$-alkoxy, halogen, COOH or $SO_3H$ $D^1$ and $D^2$ are identical or different and are the radical of a diazo component of the formula $XSO_2$—B—D—            (2)

in which

D is an unsubstituted benzene or naphthalene ring, or is a benzene or naphthalene ring which is substituted by a substituent selected from the group consisting of $C_1$–$C_4$-alkyl, substituted or unsubstituted $C_1$–$C_4$-alkoxy, substituted or unsubstituted $NH_2$, COOH, $SO_3H$, OH, halogen, $SCH_2CH_2OH$ and $SCH_2COOH$ B is a direct bond or a divalent bridging member of the formula

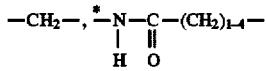

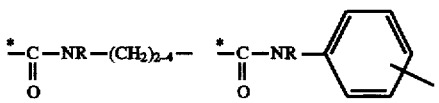

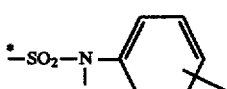

the bond marked with an asterisk being linked to the radical D and

R being H or $C_1$–$C_4$-alkyl and

X is $CH=CH_2$ or $CH_2CH_2Z$ where

Z is $OSO_3H$, $S_2O_3H$, $OPO_3H_2$, Cl, $OCOCH_3$ or $OSO_2CH_3$.

2. An azo reactive dyestuff as claimed in claim 1, which exhibits one or more of the following features:

1. $D^1=D^2$
2. $K^1=K^2$
3. B=direct bond
4. $X=CH=CH_2$ or $CH_2CH_2OSO_3H$

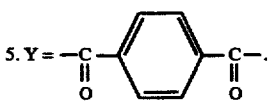

3. A process for preparing a dyestuff as claimed in claim 1 which comprises diazotizing the azo components of the formulae $D^1$—$NH_2$ and $D^2$—$NH_2$ and coupling the resulting diazonium salt solutions onto a coupling component of the formula H—$K^1$—Y—$K^2$—H or condensing the aminoazo dyestuffs of the formulae $D^1$—N=$NK^1$—H and $D^2$—N=$NK^2$—H with a bifunctional acyl compound of the formula

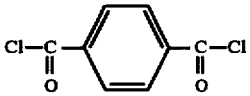

4. A solid dyestuff preparation, containing at least one reactive dyestuff, wherein said preparation comprises 30 to 95% by weight of a reactive dyestuff as claimed in claim 1 and 5 to 15% by weight of water.

5. A process for dyeing or printing hydroxyl- or amido-containing materials with a reactive dyestuff, which comprises applying thereto a dyestuff as claimed in claim 1.

* * * * *